United States Patent
Choksi

(10) Patent No.: US 7,359,726 B2
(45) Date of Patent: *Apr. 15, 2008

(54) PUSH-TO-TALK SIGNALING AND MEDIA INTER-WORKING ARCHITECTURE

(75) Inventor: Ojas Thakor Choksi, Herndon, VA (US)

(73) Assignee: Nextel Communications Inc., Overland Park, KS (US)

( * ) Notice: Subject to any disclaimer, the term of this patent is extended or adjusted under 35 U.S.C. 154(b) by 324 days.

This patent is subject to a terminal disclaimer.

(21) Appl. No.: 11/047,897

(22) Filed: Feb. 1, 2005

(65) Prior Publication Data

US 2006/0052126 A1   Mar. 9, 2006

Related U.S. Application Data

(60) Provisional application No. 60/608,126, filed on Sep. 9, 2004, provisional application No. 60/608,110, filed on Sep. 9, 2004.

(51) Int. Cl.
*H04B 7/00*   (2006.01)

(52) U.S. Cl. .................. 455/519; 455/552.1; 455/507; 455/406

(58) Field of Classification Search ................ 455/518, 455/450, 445, 560, 419, 414.3, 433, 428, 455/552.1, 519, 406, 507; 370/401, 466
See application file for complete search history.

(56) References Cited

U.S. PATENT DOCUMENTS

| | | | | |
|---|---|---|---|---|
| 2003/0236093 A1* | 12/2003 | Drozt et al. | ................ | 455/450 |
| 2004/0071131 A1* | 4/2004 | Iyer et al. | ................... | 370/352 |
| 2004/0082352 A1* | 4/2004 | Keating et al. | ............. | 455/519 |
| 2004/0133683 A1* | 7/2004 | Keller et al. | ................ | 709/227 |
| 2005/0215250 A1* | 9/2005 | Chava et al. | ............... | 455/433 |
| 2005/0237955 A1* | 10/2005 | Shapira et al. | ............. | 370/299 |
| 2006/0019690 A1* | 1/2006 | Zufall | ........................ | 455/518 |
| 2006/0025122 A1* | 2/2006 | Harris et al. | ................ | 455/419 |
| 2006/0171402 A1* | 8/2006 | Moore et al. | ............... | 370/401 |

\* cited by examiner

*Primary Examiner*—Tan Trinh

(57) ABSTRACT

An inter-working network for facilitating dispatch communications between subscribers of disparate dispatch networks includes core inter-working components and regional inter-working components. The core inter-working components include a network management system, an address translation server, a location server and a billing clearinghouse. Regional inter-working components include a plurality of points-of-presence and a plurality of border gateways interfacing each dispatch network to a point-of-presence. The billing clearinghouse collects call data from the regional points-of-presence for dispatch sessions facilitated by the inter-working architecture, performs a settlement function and creates corresponding inter-working invoices.

37 Claims, 14 Drawing Sheets

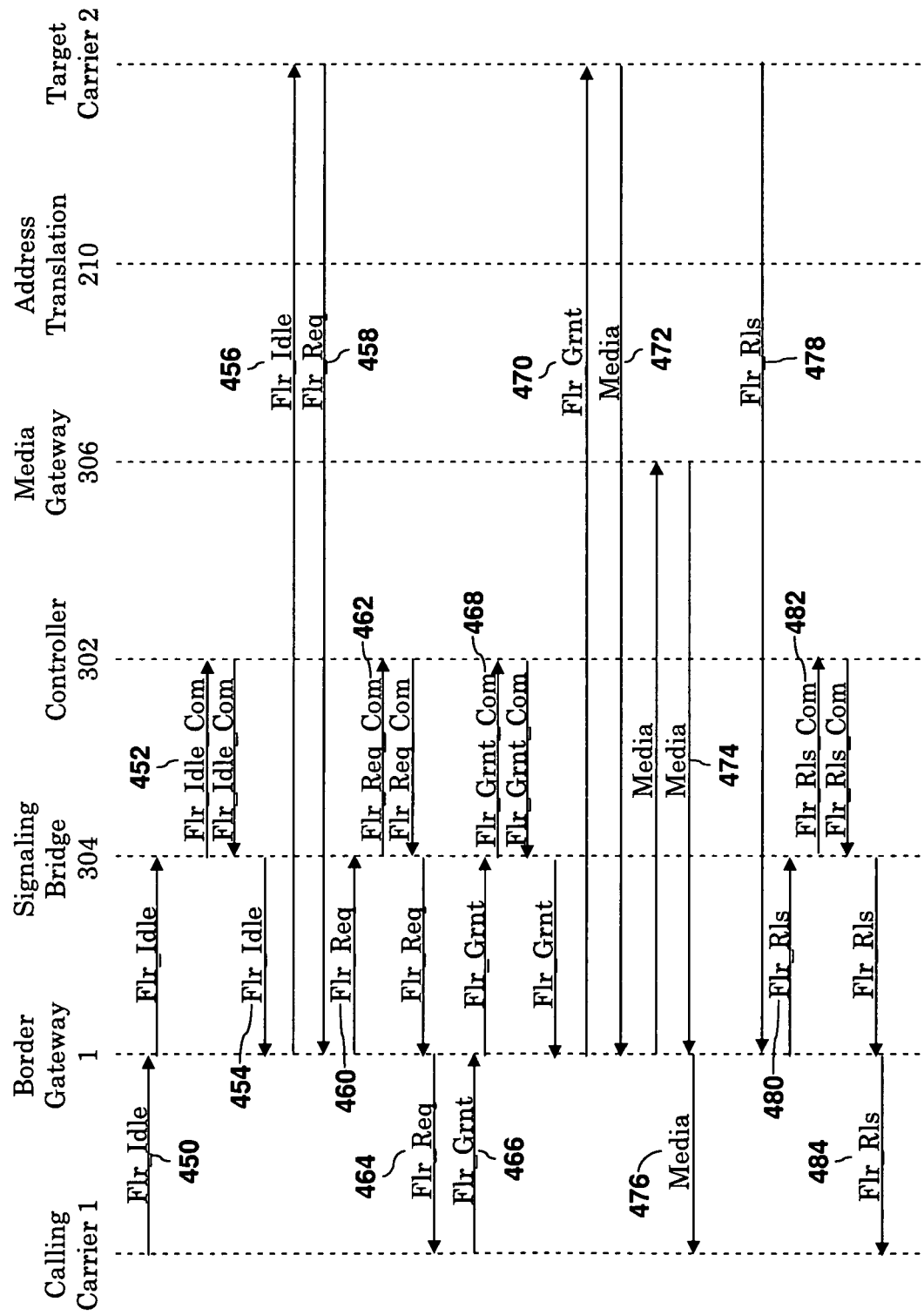

PUSH-TO-TALK SIGNALING AND MEDIA INTER-WORKING ARCHITECTURE

FIELD OF THE INVENTION

The present invention relates generally to push-to-talk (PTT) wireless communications systems and more particularly to systems and methods for inter-working and inter-operating a plurality of disparate PTT networks.

BACKGROUND OF THE INVENTION

Wireless communications systems are operated worldwide by wireless carriers who charge fees to wireless subscribers for use of the carrier's services such as interconnect, short message service (SMS), packet data and push-to-talk. Each wireless communications system services subscribers within a geographic coverage area and operates using one or more wireless technologies such as code division multiple access (CDMA), global system for mobile communication (GSM), time division multiple access (TDMA) or Advanced Mobile Phone Service (AMPS).

PTT services (also known as a walkie-talkie or dispatch services) are currently offered by some wireless carriers, such as Nextel's Direct Connect® service, and new PTT services and technologies have been proposed. Generally, a PTT call provides near-instant, half-duplex communication between a PTT caller and a target group of PTT users. PTT calls are currently limited to calls between wireless users who use compatible PTT technologies and are subscribers on the same carrier network. For example, subscribers on a network operated by a first wireless carrier cannot engage in PTT calls with PTT subscribers on a network operated by a second wireless carrier.

Proprietary solutions have been proposed to connect two or more PTT networks, but such solutions typically require each PTT network to connect separately to each of the other PTT networks. Many proposed solutions also require extensive modification to, and administration by, each carrier network and are not practical for connecting a large number of wireless carriers and technologies on a worldwide basis. Accordingly, a need exists for an inter-working network architecture that is optimized for PTT communications among subscribers on different carrier networks, irrespective of subscriber and carrier location and underlying PTT technology.

SUMMARY OF THE INVENTION

In accordance with an embodiment of the present invention, a network for inter-working a plurality of PTT networks includes a core inter-working network and at least one regional network connected to the core inter-working network. The core inter-working network includes a network management system, a group management server, a policy server, a central database, a billing clearinghouse and a service delivery architecture providing access to PTT applications. The regional network includes at least one point-of-presence (POP), and a border gateway interfacing a PTT network to the POP. In one embodiment, the POP includes a media gateway, a signaling controller, a proxy server and a database. The border gateway is adapted to route traffic between the PTT network and the POP.

In accordance with another embodiment of the present invention, a method for inter-working a plurality of disparate PTT networks includes receiving at a POP a PTT session request from an originating PTT network. The PTT session request includes a target address identifying a PTT domain associated with a target user. The PTT session request may identify a target address of a user that is not a subscriber of the originating PTT network. The session request is translated to a common inter-working format for processing by regional components in a POP. The POP locates a PTT network associated with the target user and allocates media resources for the PTT session. The translated PTT session request is forwarded to the target PTT network through a POP associated with the target PTT network. Media packets may then be transmitted between the originating caller and the target user via the allocated media resources.

BRIEF DESCRIPTION OF THE DRAWINGS

FIGS. 8a and 8b are call flow diagrams illustrating operations of the PTT inter-working architecture in accordance with the second embodiment;

DETAILED DESCRIPTION OF EXEMPLARY EMBODIMENTS

Figure 1:
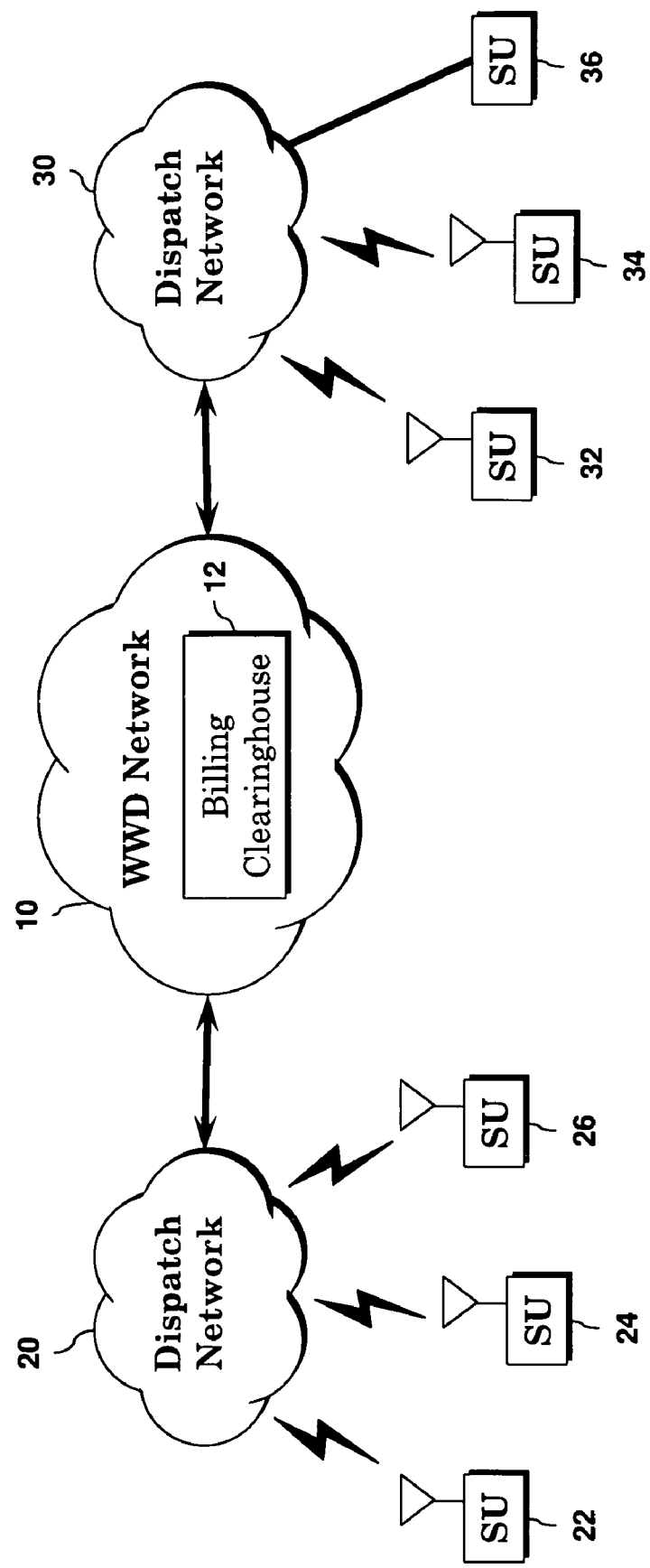
FIG. 1 is a block diagram illustrating a worldwide dispatch network in accordance with an embodiment of the present invention.

An embodiment of a worldwide dispatch architecture of the present invention will now be described with reference to FIG. 1. An inter-working architecture 10, referred to herein as a worldwide dispatch (WWD) architecture, provides a core infrastructure to which dispatch service providers may connect to enable inter-carrier and cross-technology dispatch sessions. The WWD network 10 assists in translating and managing dispatch sessions between a plurality of dispatch networks, such as dispatch network 20 and dispatch network 30, and includes a billing clearinghouse system 12 that stores call detail records (CDRs) and usage data reports (UDRs) to track, bill and provide settlement services relating to the usage of the WWD network 10.

The dispatch networks 20 and 30 may be any communications systems, including wireless and wireline networks, that facilitate dispatch communications between at least two devices. As illustrated, the dispatch network 20 is a communications network that facilitates dispatch calls between a plurality of subscriber units (SU), such as SUs 22, 24 and 26. The dispatch network 30 is a communications network that facilitates dispatch calls between a plurality of subscriber units, such as SUs 32, 34 and 36. The dispatch networks 20 and 30 may be operated by different carriers and may use different dispatch technologies and protocols.

The subscriber units may include any device that is adapted for dispatch communications with one or more of the dispatch networks. For example, the subscriber units may include wireless devices that are adapted to communicate with a dispatch network over a wireless communications link, including mobile telephones, personal digital assistants, and portable computers. The subscriber units may also include wireline devices, such as SU 36, coupled to a dispatch network through a physical connection, such as through the Internet. The dispatch networks may communicate using any of a number of dispatch protocols and technologies such as an Integrated Dispatch Enhanced Network (trademarked by Motorola, Inc. as iDEN® and hereinafter referred to as "iDEN"), a network offering high performance push-to-talk (HPPTT) functionality, such as the functionality offered by Qualcomm Inc. under the trademark QChat®, or a PTT over Cellular network (PoC). It will be appreciated that the illustrated embodiment is exemplary and that any number of networks, wireless and wireline devices may be inter-worked to operate with the WWD network 10.

In operation, a user may initiate a dispatch call with any other user connected to the WWD network 10. For example, user 22 may initiate a dispatch call with user 32. The dispatch network 20 will recognize that user 32 is not a subscriber of the dispatch network 20 and will forward an initial dispatch request to the WWD network 10. The WWD network 10 determines the address and location of the user 32, allocates necessary resources for handling the dispatch call, and forwards the initial request to dispatch network 30. The dispatch network 30 processes the initial request and responds to the WWD network 10. The WWD network 10 manages the dispatch session between user 22 and user 32 and performs any necessary translation between the formats and protocols of dispatch network 20 and dispatch network 30.

Figure 2:
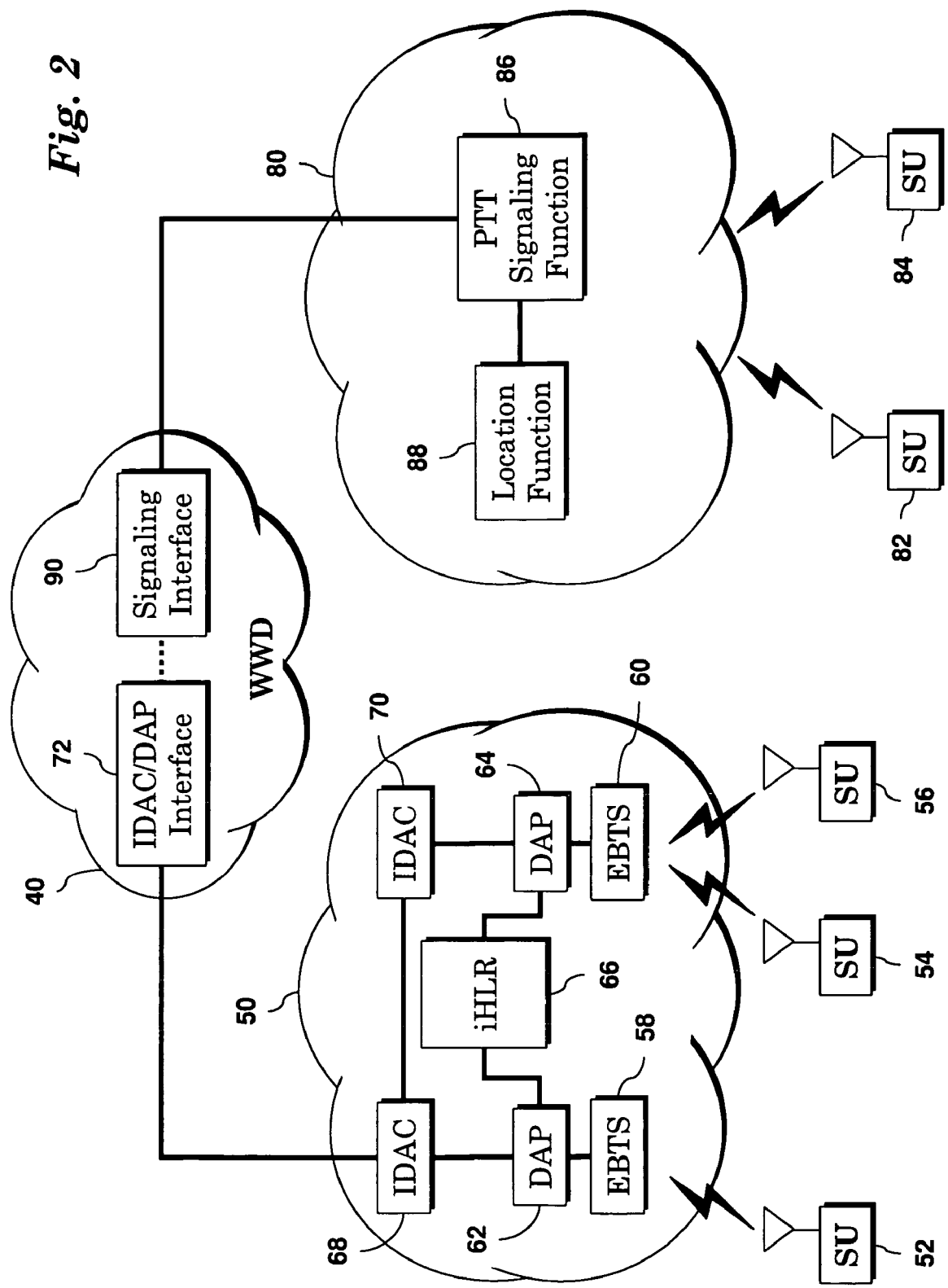
FIG. 2 illustrates functional interfaces between a worldwide dispatch network and PTT networks in accordance with an embodiment of the present invention.

An embodiment of the interface between a WWD network and dispatch networks is illustrated in FIG. 2. A WWD network 40 is connected to a plurality of PTT networks, including an iDEN network 50 and a generic PTT network 80. In an alternate embodiment, one or more PTT networks may be connected to the WWD network 40 via a GPRS Roaming exchange network or CDMA roaming exchange network.

Figure 3:
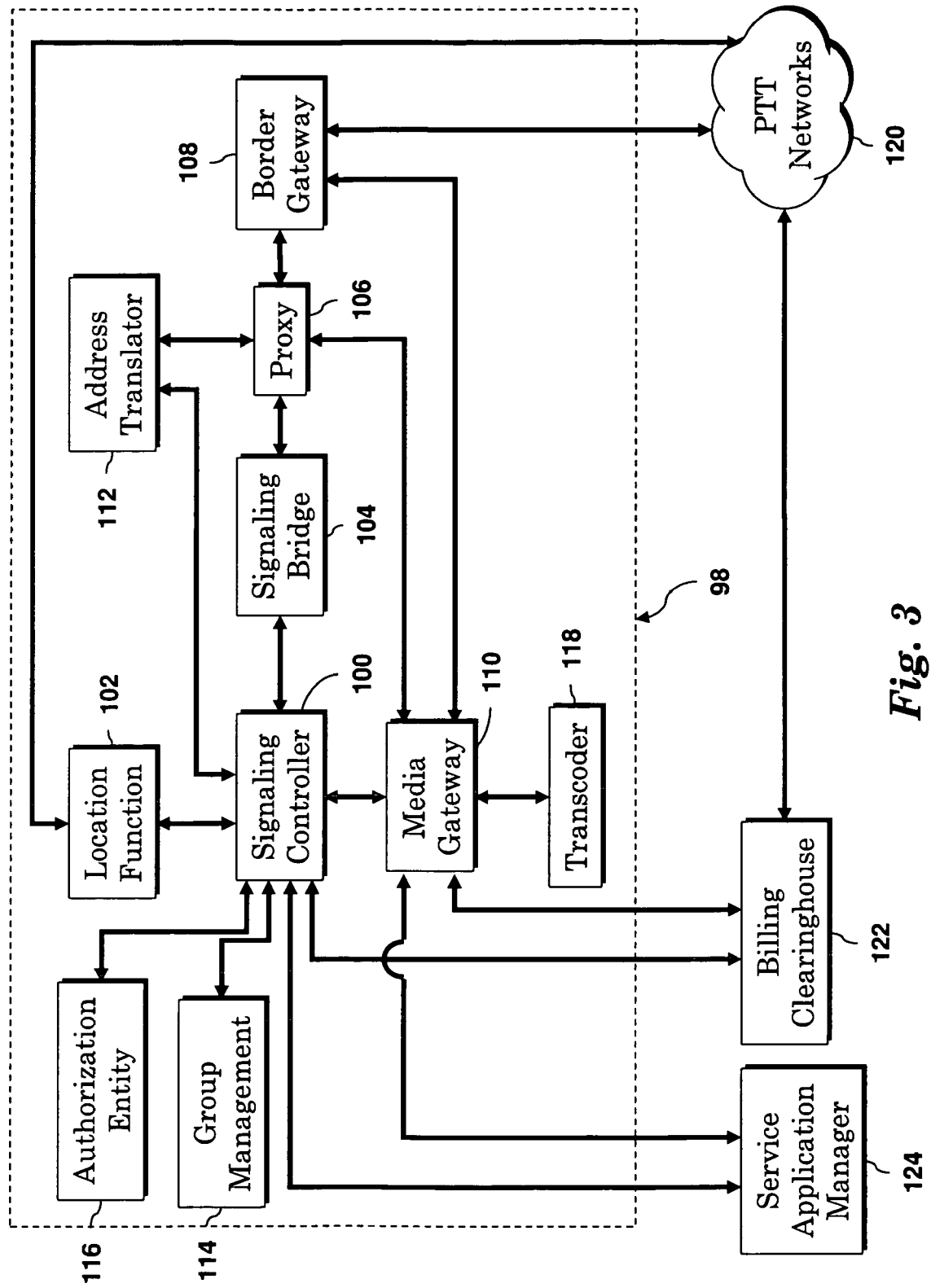
FIG. 3 is a block diagram illustrating functional elements of a worldwide dispatch architecture in accordance with an embodiment of the present invention.

The iDEN network 50 provides wireless PTT services to a plurality of subscriber units 52, 54 and 56. The iDEN network 50 includes a plurality of iDEN base stations known as enhanced base transceiver systems (EBTSs 58 and 60), a plurality of dispatch controllers known as iDEN dispatch application processors (DAPs 62 and 64) and an iDEN Home Location Register 66 (iHLR). The iDEN network 50 may also include a plurality of iDEN dispatch access controllers (iDACs 68 and 70) that facilitate PTT calls across iDEN urban areas. It will be appreciated that the iDEN network 60 illustrated in FIG. 3 is exemplary and that other network configurations can be utilized with the WWD network 40 of the present invention.

In operation, EBTS 58 provides wireless services to the subscriber unit 52, and EBTS 60 provides wireless services to the subscriber units 54 and 56. Subscriber unit 52 may initiate an ad hoc group PTT call with other subscribers on the iDEN network 60, such as subscriber units 54 and 56, by transmitting a PTT request to its local EBTS 60, which forwards the request to DAP 62. DAP 62 interfaces with the iHLR 66 to determine the location of the target subscriber units 54 and 56. DAP 62 (the controlling DAP) next communicates with DAP 64 (the remote DAP) to page the subscriber units 54 and 56, setup the PTT call, and manage the PTT call.

Subscriber unit 52 may also initiate a group PTT call with subscriber units 82 and 84 that are serviced by PTT network 80. In the exemplary embodiment, the location of subscriber units 82 and 84 are not known to the DAP 62 and iHLR 66, and the iDEN network 50 is configured to forward such foreign (or otherwise unknown) PTT targets to the WWD network 40. The iDEN network 50 is connected to the WWD network 40 through an iDAC/DAP interface 72. In this manner the WWD network 40 is seen by the iDEN network 50 as another DAP, i.e., a standard component of the iDEN network. DAP 62 (the controlling DAP) communicates with the iDAC/DAP interface 72 (the remote DAP) to page the mobile stations 82 and 84, setup the PTT call and manage the PTT call. Because the WWD network 40 is seen as a DAP by the iDEN network 50, no further modification of the iDEN network is necessary.

The PTT network 80 interfaces with the WWD network 50 in a similar manner. The PTT network 80 includes a PTT signaling function 86 that manages PTT sessions between a plurality of PTT network subscribers, such as subscriber units 82 and 84. In operation, the subscriber unit 82 may initiate a PTT call to another subscriber on the PTT network 80, such as subscriber unit 84. The PTT signaling function 86 receives the initial PTT request, works with the location function 88 to determine the location of the target subscriber unit 84, forwards the PTT request to the target subscriber unit 84, sets up and manages the PTT call.

The subscriber unit 82 may also initiate a PTT call to a target subscriber unit on a different PTT network, such as subscriber unit 52 on iDEN network 50. In accordance with an embodiment of the present invention, the PTT signaling function 86 is adapted to forward foreign target addresses, such as an address of a user not currently being serviced by the PTT network 80, to the WWD network 40. The WWD network 40 includes a PTT signaling controller interface 90 for interfacing with the PTT signaling function 86. In one embodiment, the signaling interface 90 is seen by the PTT signaling function 86 as a common network element of the PTT network 80, such as a remote signaling controller. The PTT signaling function 86 forwards the session request to the PTT signaling interface 90. The WWD network 50, through the iDAC/DAP interface 72 forwards the session request to the iDEN network 50 which processes the request in substantially the same manner as if it came from an internal iDEN DAP.

The WWD network 40 performs the necessary signaling translation between the originating and the terminating legs of a PTT session and ensures that appropriate media resources are allocated to service the PTT session. The WWD network 40 also translates in-session requests including the addition of a member to the PTT call and deletion of a member from a group call. In one embodiment, the WWD network 40 is adapted to translate across talker arbitration protocols implemented by various PTT technology vendors, including via the signaling plane using SIP method(s) and via the bearer plane using extensions to the RTCP protocol.

An embodiment of a WWD architecture will now be described with reference to the functional block diagram of FIG. 3. It should be noted that the functional components in FIG. 3 are not necessarily individual physical components or software modules, and that one or more components may be combined into a single physical component or software module or distributed across a plurality of physical devices and locations. Various physical architectures will be discussed in connection with FIGS. 4-13.

A WWD architecture 98 includes a signaling controller 100 that manages communications across PTT carriers and technologies. The signaling controller 100 is adapted to locate target users from the addresses received from the calling network. The PTT network on which the target user is located is determined via lookup by querying the address translator 112 and the location function 102. In one embodiment, the domain portion of the target user address is used to identify the target PTT network 120. After the PTT networks are identified, a determination is made as to whether transcoding is required between the calling PTT network and target PTT network through a transcoder 118. The signaling controller 100 may also host and manage sessions for roaming subscribers and locate users in a WWD roaming database. It is further contemplated that the signaling controller 100 may perform admission control to prevent unwanted access to the WWC architecture 98 and, with respect to authorized PTT access, enforce restrictions based on resource availability and contractual terms and conditions.

A location function entity 102 is connected to the signaling controller 100. The location function 102 assists in PTT registration of roaming subscribers across PTT networks 120 in the WWD network, tracks the locations of roaming users and notifies the signaling controller 100 of roaming user location for appropriate routing of incoming sessions. The location function 102 also interfaces with corresponding location functions of participating PTT networks to perform registration of roaming subscribers.

A signaling bridge 104 converts session and signaling messages from one PTT technology to another. In one embodiment, each PTT technology is translated into a format that is common across the WWD network based on a static mapping of the applicable network address to the corresponding PTT technology. In one embodiment, the common network protocol is based on SIP (session initiation protocol), with extensions added as necessary to facilitate the communications described herein. Alternatively, the translation may be based on an explicit protocol type embedded in the messages. The signaling bridge 104 is interfaced with the signaling controller 100, which uses the interface to exchange signaling messages with the signaling bridge 104 in a common format.

A proxy 106 analyzes incoming session requests to determine whether the originating and terminating PTT networks use the same PTT technology. If the same PTT technology is used then the proxy 106 facilitates communications between the originating and terminating PTT networks without translation. The proxy 106 is adapted to optimize the latency performance of sessions originating from and terminating to subscribers with the same PTT technology but belonging to different carrier networks. If different technologies are used, then the session is routed to the signaling bridge 104 for translation. In one embodiment, the proxy 106 makes routing decisions based on address translation data received from an address translator 112. Alternatively, the proxy 106 may make routing decisions based on PTT protocol type information embedded in the session header. In one embodiment, the proxy 106 is interfaced with the media gateway 110, and the proxy 106 routes sessions to the media gateway 110 when signaling translation is not required (due to the same signaling format being used between PTT networks), but media translation is required (due to different media formats being used between PTT networks).

A group management entity 114 is connected to the signaling controller 100 for managing inter-network group sessions on behalf of PTT carriers. The group management entity 114 provides group definitions to the signaling controller 100 and brokers and assists in the propagation definition of groups spanning across multiple PTT carriers. The group management entity 114 includes an interface to group management servers associated with one or more of the PTT networks 120. In one embodiment, the group management entity 114 also provides group definitions to a service application manager 124. The service application manager 124 interfaces with the WWD architecture 98 to provide static and dynamic data to PTT applications to process and deliver value added features to subscribers of the PTT networks.

The authorization entity 116 is connected to the signaling controller 100 and operates to manage call restrictions and authorization data for roaming subscribers and session requests to and from subscribers to applications from the service application manager 124.

In one embodiment, the WWD network 98 authorizes PTT sessions at the carrier level, and assumes that a subscriber initiating a PTT session has already been authenticated and authorized by the originating carrier. Access to applications available through the WWD network 98 are also authorized at the carrier level rather than at the subscriber level. In this manner, individual subscribers will not have to register with the WWD network 98 to enable cross-carrier PTT services.

The WWD network 98 is adapted to translate user addresses to identify the terminating network, perform appropriate translation and route the translated sessions to the proper target network. These translation functions are performed by the address translator 112. The address translator 112 provides translation services to the proxy 106 and the signaling controller 100 to map domains into IP addresses to properly route session messages. In the event different naming conventions are used across two or more PTT networks 120, the address translator 112 also provides translation of user addresses. In alternate embodiments, the user address translation may be performed at the signaling controller 100 or the signaling bridge 104. It is further contemplated that individual PTT networks 120 may perform user address translation within the PTT network.

The media gateway 110 is interfaced with the signaling controller 100 and is used to setup media paths, exchange media type and type of transcoding to be done by the media gateway 110. The MEGACO (media gateway control) protocol with enhancements may be used for this interface. The media gateway 110 is also interfaced with the PTT networks 120 to exchange and transport media packets between the WWD network 98 and the PTT network's media gateways.

In one embodiment, the media gateway 110 also performs jitter buffering to minimize the variable delays encountered inside and outside of the WWD administrative domain. The media gateway 110 also performs latency smoothing to avoid floor starvation during a group call spanning two or more carriers. In another embodiment, the media gateway 110 schedules session streams in accordance with service level agreements with associated PTT carriers to ensure appropriate treatment is accorded to the media per the agreements.

The transcoder 118 translates between voice formats to facilitate voice sessions across a plurality of carriers and technologies. The transcoder 118 is used when the end points of a session do not support a common codec. In one embodiment, the transcoder 118 is implemented as part of the media gateway 110.

In the exemplary embodiment, the border gateway 108 is connected to the media gateway 110 via an IP network. The signaling and media traffic between the WWD network 98 and the PTT networks 120 passes through the border gateway 108. The border gateway 108 hosts the necessary trust relationships and related security associations between the WWD network 98 and the PTT networks 120. In one embodiment, the border gateway 108 performs metering, marking, classifying and policing of the traffic traversing the border gateway 108 in both directions in accordance with aggregate carrier service level agreements, which may include multiple levels of quality of service including requirements specifying network availability, latency and packet loss rate and service availability and denial and billing accuracy.

Each PTT network 120 is connected to the WWD network 98 through the border gateway 108. In the exemplary embodiment, IPSEC (IP Security Protocol) association may be the basis of the interface between the border gateway 108 and the PTT networks 120. In one embodiment, a public IP address is assigned to each WWD service element that has an external interface accessible to the PTT networks 120 including: the border gateway 108, the proxy 106, the media gateway 110, the location server 102, the group management entity 114 and the address translator 112.

A billing clearinghouse 122 collects and aggregates UDRs and CDRs from the signaling controller 100 and media gateway 110. The billing clearinghouse 122 includes a settlement function that applies settlement logic to the collected data to perform reconciliation and create inter-carrier settlement invoices for the WWD sessions.

In the exemplary embodiment, each PTT network 120 is assumed to be a separate administrative domain that includes a call control function that manages PTT sessions within the PTT network, a media server, a talker arbitration function for managing floor control during a PTT session, and a group management function for administering group calls. The PTT network may also include other functional entities such as a registration/authentication function to ensure a caller is a valid subscriber, a compression function for efficient utilization of bandwidth, a service discovery function to locate network elements, and a location function for assisting in authentication and a roaming/authorization function.

Figure 4:
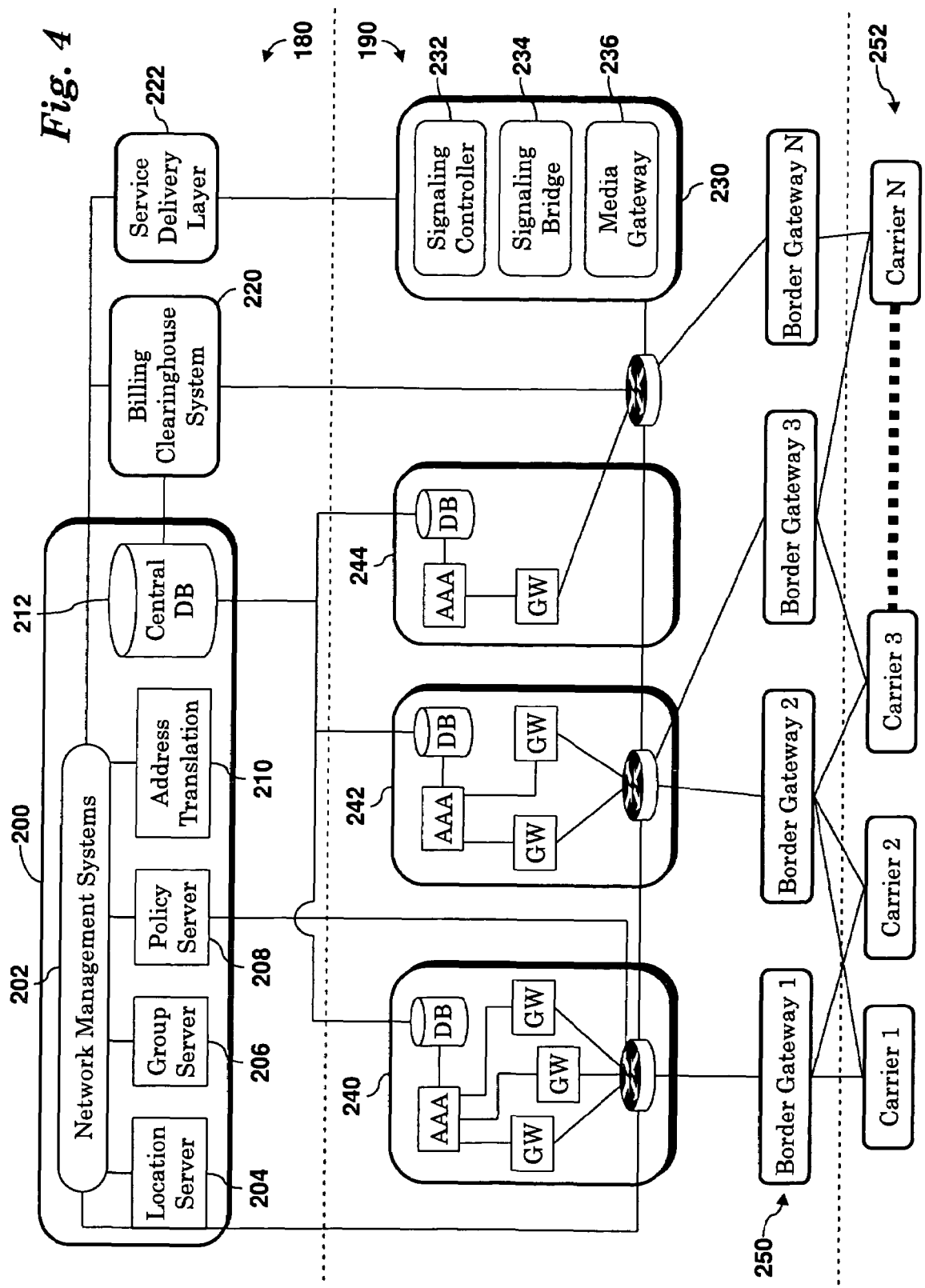
FIG. 4 illustrates a first embodiment of a PTT inter-working architecture.
Figure 5:
FIG. 5 is a call flow diagram illustrating an operation of the PTT inter-working architecture of the first embodiment.

Referring to FIG. 4, a first embodiment of a physical architecture to facilitate PTT interoperability across wireless carriers with disparate PTT technologies is illustrated. The architecture includes core network components 180 and regional network components 190. The core network components 180 include core inter-working components 200, a billing clearinghouse system 220 and a service delivery architecture 222. The core inter-working components 200 include network management systems 202, a location server 204, a group server 206, a policy server 208, an address translation server 210 and a centralized database 212.

The regional network 190 includes at least one point-of-presence (POP), such as POPs 240, 242 and 244. Each POP 240, 242 and 244 includes at least one custom PTT gateway (GW), an Authentication, Authorization and Accounting function (AAA) and a regional database (DB). The data in each regional database DB is replicated and synchronized with the central database 212. In one embodiment, each custom PTT gateway GW includes a proxy function, a signaling controller, a signaling bridge function for each supported technology and media gateways, as discussed above with respect to FIG. 3.

The carriers 252 may operate across a plurality of regions and connect to the inter-working architecture through a local border gateway 250. The connection between a local border gateway 250 and a carrier may be a leased line, fiber based layer 1 connection; ATM, LAN, Frame Relay based layer 2 connection; an IP VPN based layer 3 connection; or other connection as known to those skilled in the art. In one embodiment, each carrier network 252 also connects to at least one backup border gateway 250. The border gateways 250 route traffic from the carrier's network to a corresponding regional POP associated with the carrier's inter-working vendor.

Each custom gateway GW is adapted to create and forward CDRs to the billing clearinghouse 220, which stores the CDRs for subsequent processing by the settlement function. In one embodiment, to facilitate operation of PTT centric applications through the service delivery architecture 222, an inter-working vendor may include a service delivery interface 230 that includes signaling controller 232, signaling bridge 234 and media gateway 236.

In one embodiment, the carrier PTT networks 252 identify available inter-working gateways through standard discovery mechanisms, such as a DNS query. When participating in an inter-working session, the carrier PTT network is adapted to route the inter-carrier session to the appropriate custom gateway in the WWD network. The custom gateway is adapted to locate the target user(s), select media resources, perform technology translation and forward the session request to the respective carrier(s) of the target user(s).

In operation, a carrier network 252 is adapted to forward WWD requests to a regional POP associated with its WWD network interface. An embodiment of the operation of the architecture of FIG. 4 will now be described with reference to FIG. 5. An incoming WWD request 260 from Carrier 1 may be forwarded through a regional border gateway to a custom gateway in the WWD network. In one embodiment, the Carrier 1 locates an appropriate custom gateway via DNS discovery. The custom gateway may determine whether the session should be serviced by a different custom gateway, such as customer gateway in a different POP, and if appropriate, forwards the request to another custom gateway in step 262 to service the session. The custom gateway determines whether the originating and target technologies are the same (intra-technology call) or different (inter-technology call) in step 264. If the request is for an inter-technology call then the custom gateway translates the request to the target technology and performs necessary address and name translation in steps 266 and 268, respectively. The custom gateway next determines the location of the target users in step 270, selects appropriate vocoders in step 272, selects appropriate media servers in step 274 and determines the regional components serving the target carrier in step 276. The custom gateway next checks where to forward the request and then forwards the request to the appropriate target carrier network, Carrier 2, in step 278.

Figure 6:
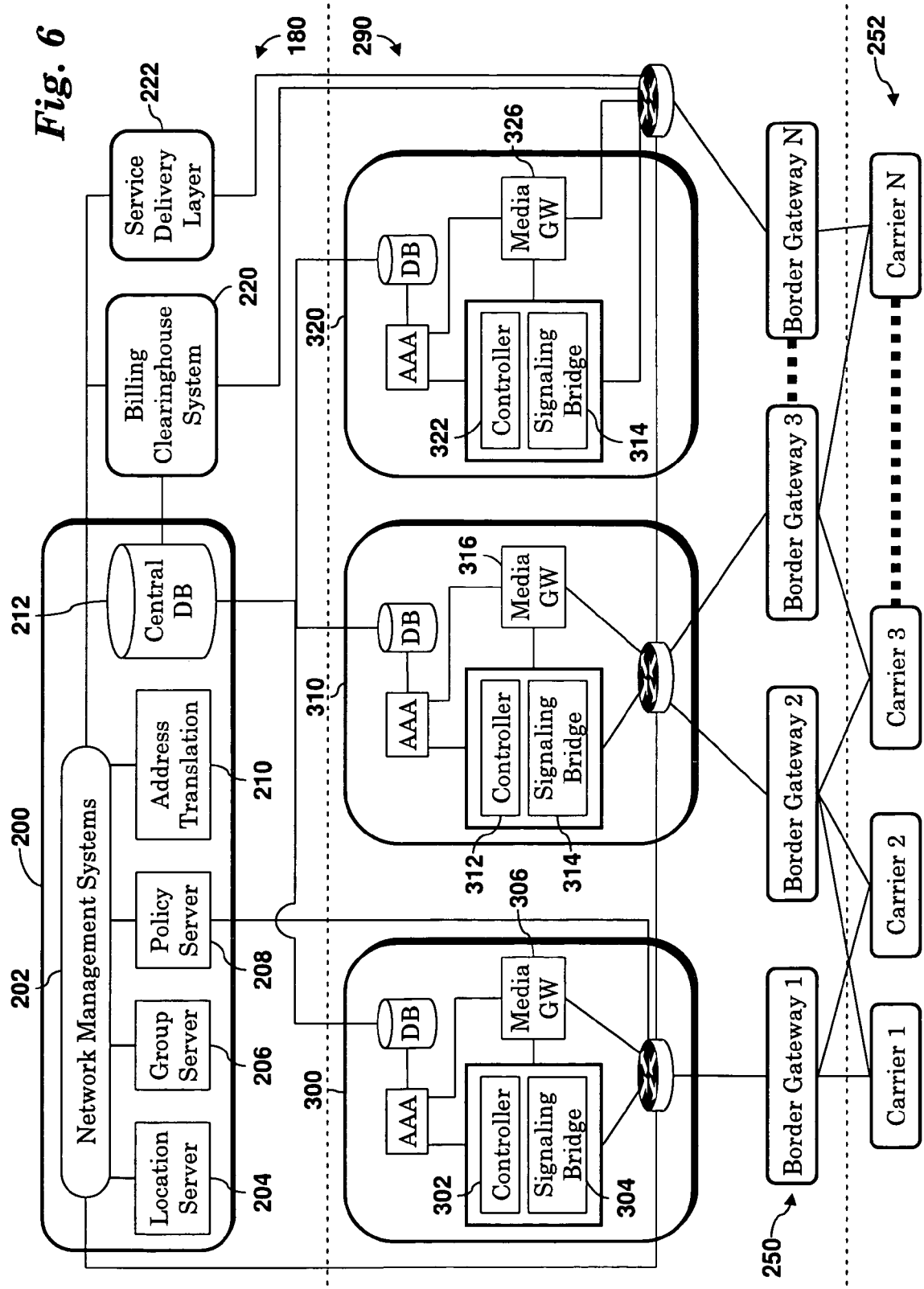
FIG. 6 illustrates a second embodiment of a PTT inter-working architecture.

A second embodiment of an architecture to facilitate PTT interoperability across wireless carriers with disparate PTT technologies is illustrated in FIG. 6. In this embodiment, the originating call is translated into a common signaling format within the WWD network before session processing, regardless of the originating and terminating technologies. After processing, the session is translated into the format of the terminating technology before being forwarded to the called party.

The second embodiment may include the same core network components 180, border gateways 250 and carrier networks 252 of the first embodiment illustrated in FIG. 4. The regional network components 290 include a plurality of POPs, such as POPs 300, 310 and 320. Each POP includes a signaling controller (302, 312, and 322, respectively), a signaling bridge (304, 314 and 324, respectively), and a media gateway (306, 316 and 326, respectively). Since every session is translated into a common format, custom gateways as used in the first embodiment are not required.

Figure 7:
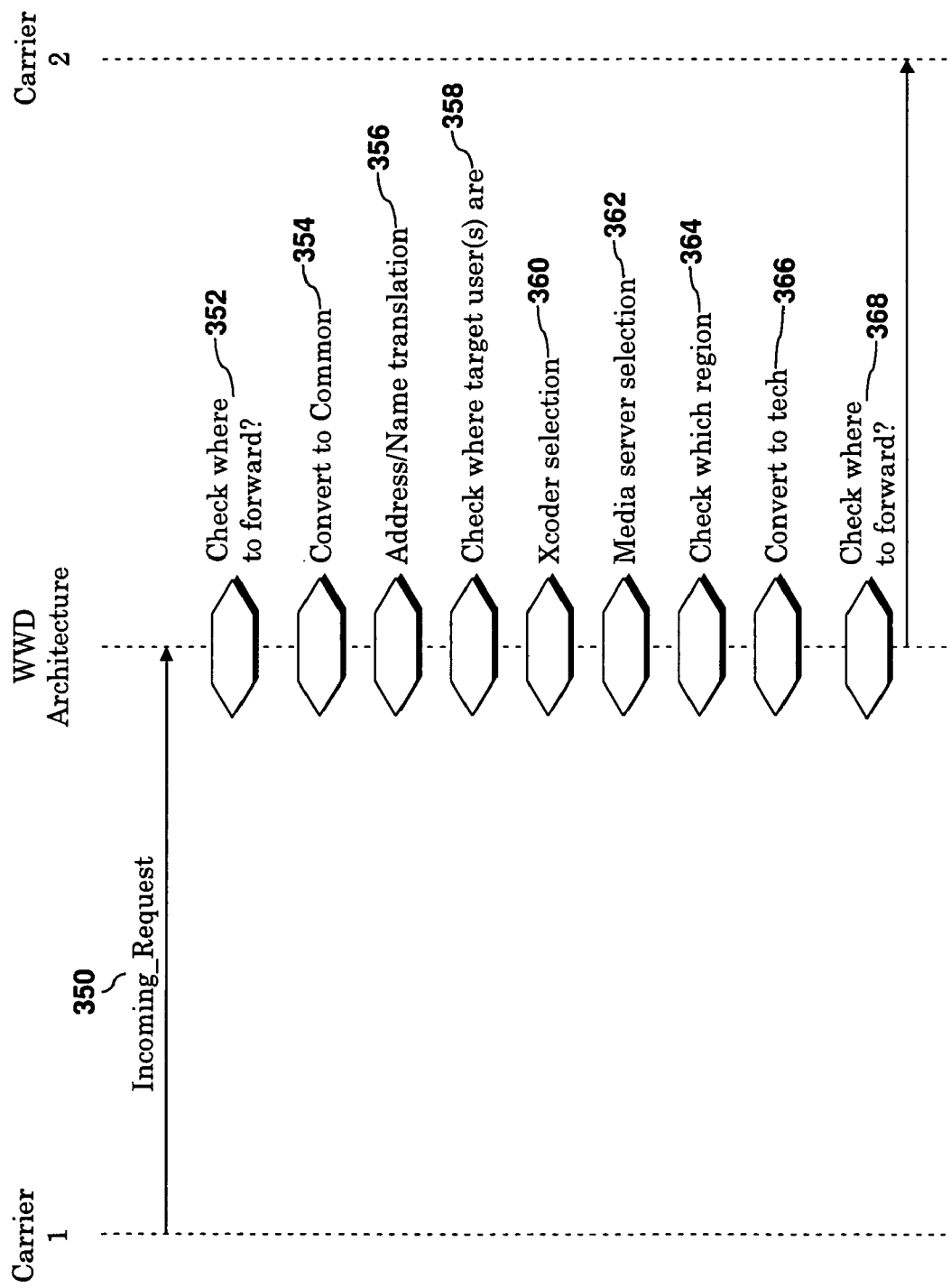
FIG. 7 is a call flow illustrating an operation of the PTT inter-working architecture of the second embodiment.

An embodiment of the operation of the architecture of FIG. 6 will now be described with reference to FIG. 7. In operation, the PTT networks 252, such as Carrier 1, route incoming WWD sessions to regional inter-working components that service the respective PTT networks. The regional inter-working components translate the incoming session request 350 into a common format used in the WWD network 354. The regional inter-working components process the call and interact with the core inter-working components and other regional inter-working components to perform address translation 356, locate the target users 358, and set up vocoders 360 and media servers 362. Regional inter-working components associated with the terminating carrier, such as Carrier 2, are identified in step 364, the session is translated into the terminating technology format in step 366, and the translated request is forwarded to the terminating carrier in step 368. Because all sessions undergo translation, irrespective of the originating and terminating technologies, the proxy function is not required in this embodiment.

Figure 8A:
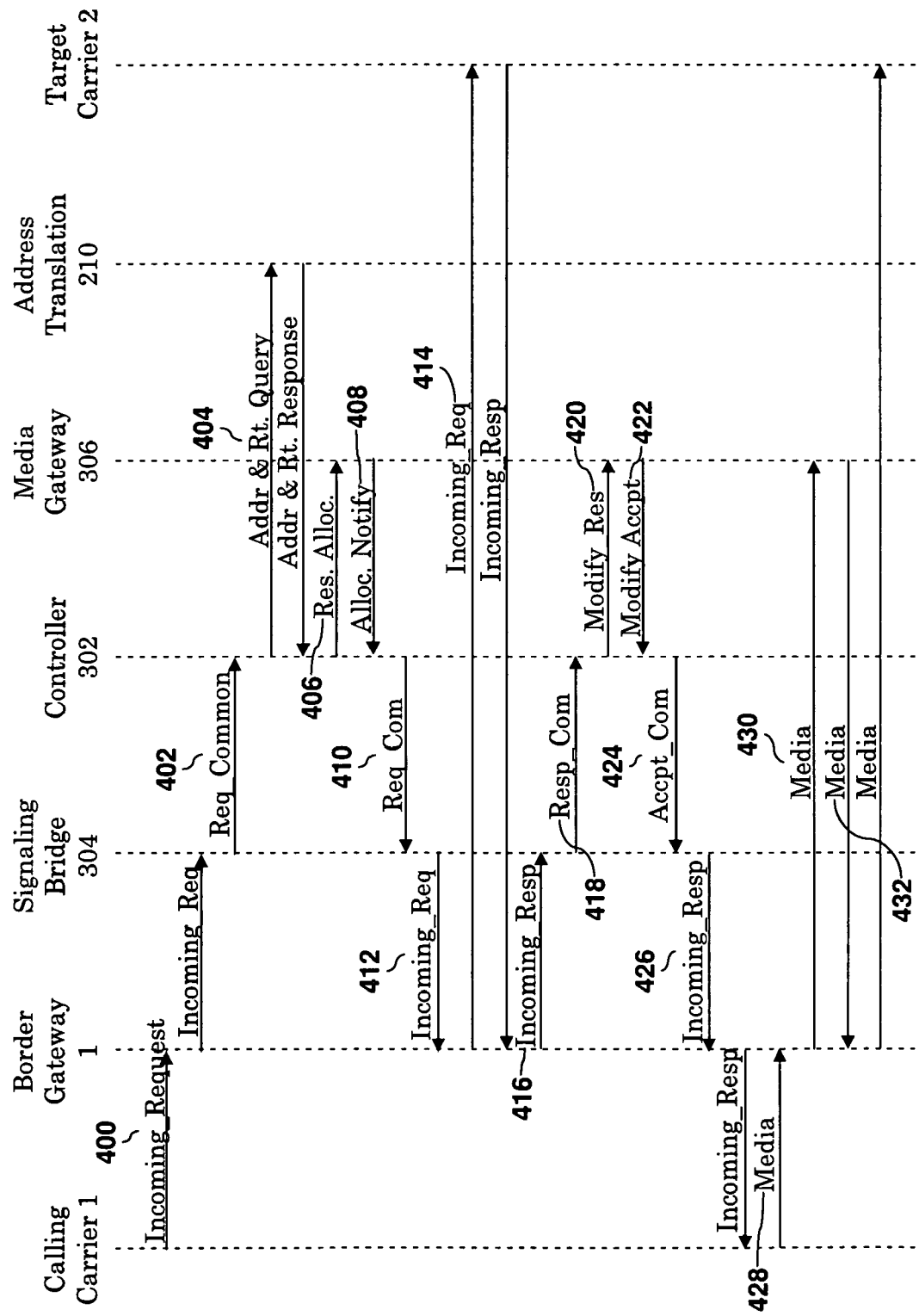

The operation of the inter-working architecture of FIG. 6 will now be described in further detail with reference to the call flows illustrated in FIGS. 8a, 8b, 9a & 9b. FIG. 8a illustrates a call flow for a session traversing a single signaling bridge, controller and media gateway. The originating carrier network 1 initiates an inter-carrier PTT call to a target wireless carrier 2 by transmitting an incoming request 400 to border gateway 1, which forwards the request to signaling bridge 304 of the POP 300. The signaling bridge 304 translates the request to a common WWD format and forwards the translated request 402 to the controller 302. The controller 302 transmits a corresponding address and routing query 404 to the address translation server 210, which provides address and routing information in response. The controller 302 next communicates with a media gateway 306 to allocate the necessary resources to handle the PTT session (messages 406 and 408).

The incoming request is next forwarded to the target mobile carrier 2 in steps 410 through 414. First, the controller 302 transmits the request 410 to the signaling bridge 304, which translates the message from the common WWD format to a format compatible with the target mobile carrier 2, and transmits the incoming request 412 to the border gateway 1. The border gateway 1 transmits the incoming request 414 to the target mobile carrier 2, which responds to the request. The border gateway 1 forwards the incoming response 416 to the signaling bridge 304, which forwards the message in the common WWD format 418 to the controller 302. The controller 302 next communicates with a media gateway 306 to modify the allocated media resources as necessary to handle the PTT session (messages 420 and 422). The controller 302 forwards the accept message 424 to the signaling bridge 304 which translates the message into the format of the originating Carrier 1 and forwards the translated message 426 to the border gateway 1, which forwards the message to the originating Carrier 1.

After the PTT session is setup, the caller may speak into the dispatch device for transmission to the target user. Media packets 428 are transmitted from the calling Carrier 1 to the border gateway 1 which forwards the received media packets 430 to the media gateway 306. The media gateway 306 translates the media packets 430 into the format of target carrier 2 and returns the translated media packets 432 to the border gateway 1, which forwards the media packets to the target carrier 2, and subsequently, to the target dispatch device.

FIG. 8b illustrates a call flow for the session of FIG. 8a in which the target user transmits a voice response to the originating user. After the caller releases the PTT-button on the dispatch device, the calling carrier 1 transmits a flr_idle message 450 to indicate that the caller is relinquishing the floor. The flr_idle message 450 is transmitted to the signaling bridge 304 through border gateway 1. The signaling bridge 304 converts the flr_idle message into a common WWD format 452 used by the POP 300, and forwards the message to the controller 302. The controller 302 forwards the message to signaling bridge 304 for forwarding to the target carrier 2. The signaling bridge 304 translates the flr_idle message from the common format to the format of the target carrier 2, and forwards the translated flr_idle message 454 to the border gateway 1, which forwards the message 456 to the target carrier 2.

The user of the target device may then press the PTT-button on the target device to claim control of the floor and begin speaking. The target carrier 2 transmits a floor request, flr_req 458, to the border gateway 1, which forwards the message 460 to the signaling bridge 304. The signaling bridge 304 translates the message into a common WWD format 462 and forwards the request to the controller 302 which determines that the floor request should be sent to the calling Carrier 1 which is managing the PTT session. The signaling bridge 304 translates the flr_req message into the format of the calling Carrier 1 and forwards the message 464 to the calling Carrier 1 through the border gateway 1.

If calling Carrier 1 grants the floor to the target user, it sends a flr_grnt message 466 to the signaling bridge 304 through the border gateway 1. The signaling bridge 304 translates the flr_grnt message into the common format 468 and the controller 302 determines that the message should be forwarded to the target carrier 2. The signaling bridge 304 converts the message into the format of the target carrier 2 and transmits the flr_grnt message to the target carrier 2 through the border gateway 1. Media packets 472 carrying the target user's speech is received from the target carrier 2 and forwarded to the border gateway 1, which forwards the media to the media gateway 306 for translation into the calling carrier's format. The translated media packets 474 are then forwarded to the calling carrier 1.

When the target user releases the PTT-button, a floor release message, flr_rls 478, is transmitted from the target carrier 2 to the border gateway 1. The flr_rls message 480 is translated into a common format 482 by the controller 302, and then into the calling carrier's format 484 by the signaling bridge 304. Finally, the flr_rls message is transmitted to the calling carrier 1.

Figure 9A:
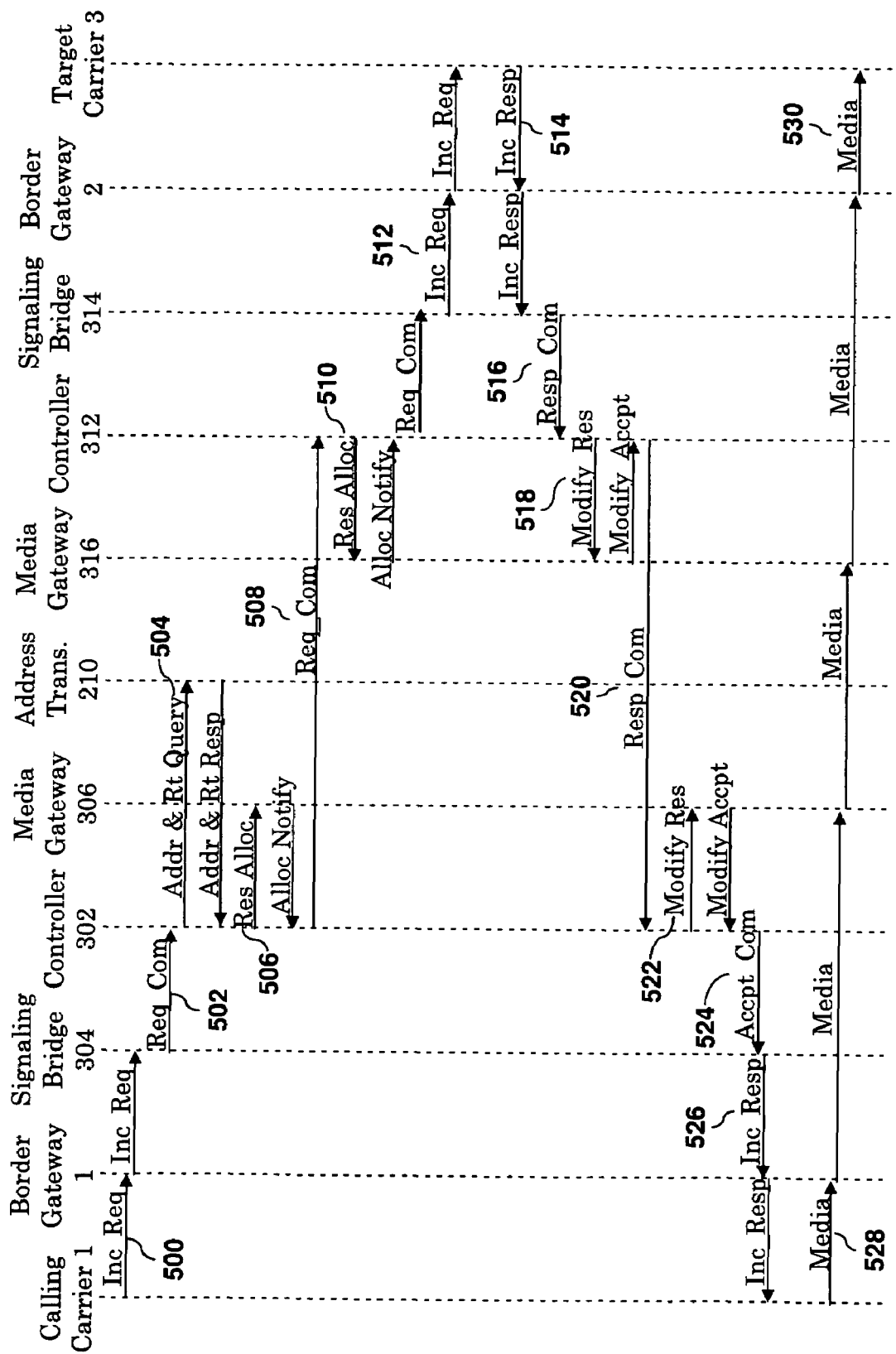
FIGS. 9a and 9b are additional call flow diagrams illustrating operations of the PTT inter-working architecture in accordance with the second embodiment.

FIG. 9a illustrates a call flow for another embodiment with the session originating and terminating in different signaling and media elements. The originating and terminating elements may be located in the same POP, or in different POPs, such as POPs 300 and 310, respectively. The calling carrier 1 initiates an inter-carrier PTT call to a target carrier 3 by transmitting an incoming request 500 to border gateway 1, which forwards the request to signaling bridge 304. The signaling bridge 304 translates the request to a common inter-working format and forwards request 502 to the controller 302. The controller 302 transmits a corresponding address and routing query 504 to the address translation server 210, which provides address and route information in response. The controller 302 next communicates 506 with the media gateway 306 to allocate necessary resources for the PTT call.

The controller 302, based on the received routing information, transmits the request 508 to controller 312. The controller 312 communicates 510 with the local media gateway 316 to allocate the resources necessary to translate media from the target carrier 3 to the common inter-carrier format. Next, the request is translated to the target carrier 3 format by the signaling bridge 314 and forwarded 512 to the target carrier 3.

The border gateway 2 receives an incoming response from the target carrier 3 and forwards the incoming response 514 to the signaling bridge 314, which forwards the response message in a common format 516 to the controller 312. After receiving the response, the controller 302 sets up media resources within the media gateway 306 by exchanging messages 518. The controller 302 next forwards the response 520 to the controller 302. The response is forwarded 522 to the media gateway 306 which returns an accept message to the controller 302. The response is then forwarded to the calling carrier 1 through the signaling bridge 304, which provides translation, and the border gateway 1.

After the PTT session is setup, the caller may speak into the dispatch device for transmission to the target user. Media packets 528 are transmitted from the calling carrier 1 to the border gateway 1 which forwards the received media packets to the media gateway 306. The media gateway 306 translates the media packets 430 into a common inter-working format and forwards the translated media packets to media gateway 316. Media gateway 316 converts the media packets from the common format to the format of target carrier 3 and transmits the media packets 530 to the target carrier 3 through the border gateway 2.

Figure 9B:
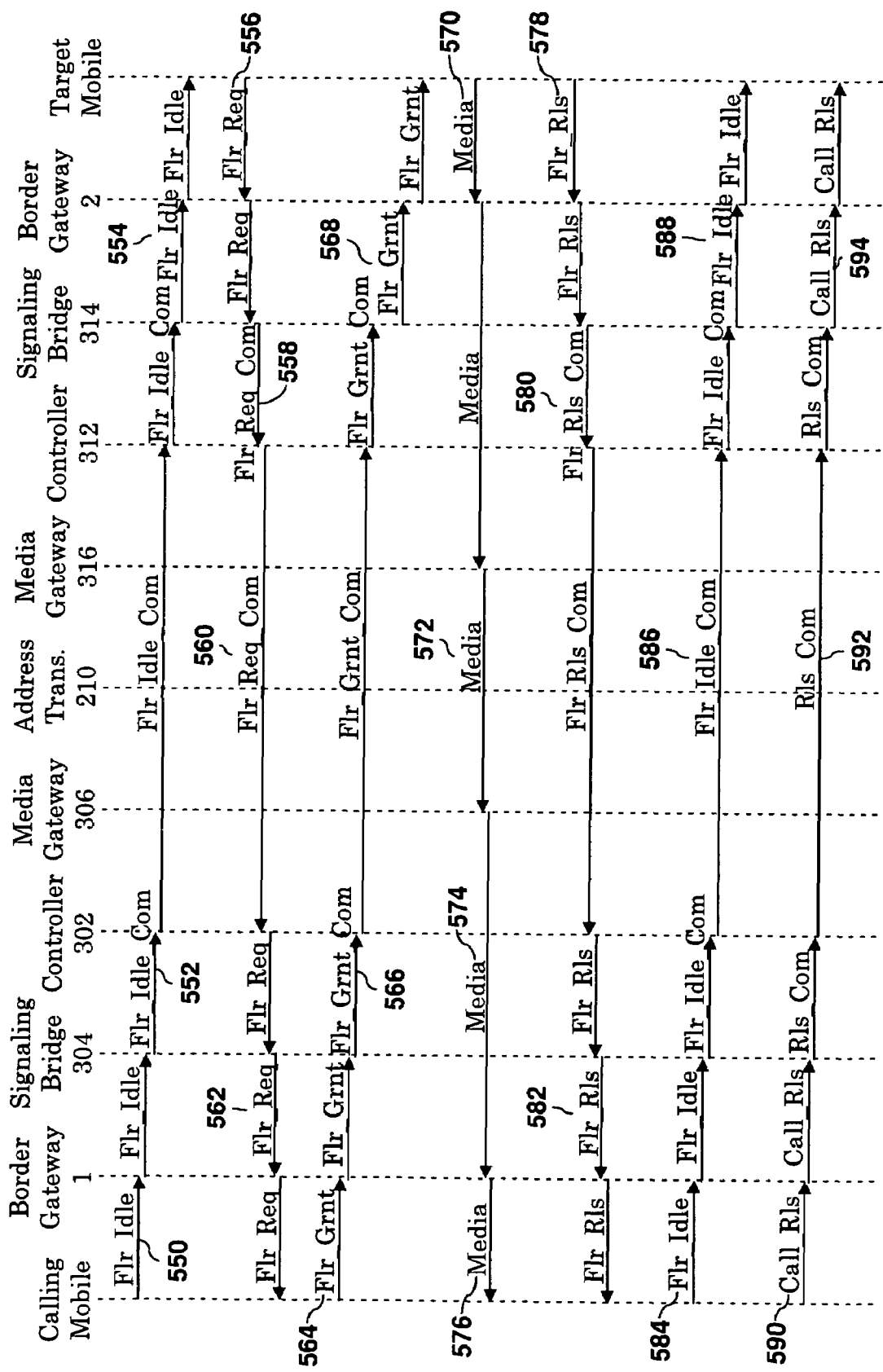

FIG. 9b illustrates a further call flow for the session of FIG. 9a in which the target user responds to the calling dispatch device. When the caller releases the PTT-button on the calling dispatch device, the calling carrier 1 transmits a flr_idle message 550 to indicate that the caller is relinquishing the floor. The flr_idle message 550 is transmitted to the signaling bridge 304 through border gateway 1. The signaling bridge 304 converts the flr_idle message into a common format 552 used by the inter-working architecture, and forwards the message to the controller 302. The controller 302 forwards the message to controller 312 which forwards the flr_idle_com message to signaling bridge 314. The signaling bridge 314 translates the flr_idle_com message from the common format to the format of the target carrier 3, and forwards the translated flr_idle message 554 to the border gateway 2, which forwards the message to the target carrier 3.

The user of the target user may then press the PTT-button on the target user to claim control of the floor and begin speaking. The target carrier 3 transmits a floor request, flr_req 556, to the border gateway 2, which forwards the message to the signaling bridge 314. The signaling bridge 314 translates the message into a common format 558 and forwards the request to the controller 312. Controller 312 determines that the floor request should be sent to the calling carrier 1 which is managing the PTT session and forwards the floor request to the controller 302. The message is then transmitted to the signaling bridge 304 which translates the flr_req message into the format of the calling carrier 1 and forwards the message 562 to the calling carrier 1 through the border gateway 1.

If calling carrier 1 grants the floor to the target user, then it returns a flr_grnt message 564 to the signaling bridge 304 through the border gateway 1. The signaling bridge translates the flr_grnt message into the common format 566 and the controller 302 determines that the message should be forwarded to the target carrier 2. The message is transmitted to the controller 312, translated by the signaling bridge 314 into the format of the target carrier 2 and forwarded to the target carrier 3 through the border gateway 2. Media packets 570 carrying the target user's audio data are received from the target carrier 3 and forwarded to the border gateway 2, which forwards the media to the media gateway 316 for translation into the common inter-working format and then to the media gateway 306 for translation into the format of the calling carrier 1. The translated media packets 576 are then forwarded to the calling carrier 1.

When the target user releases the PTT-button, a floor release message, flr_rls 578, is transmitted from the target carrier 3 to the border gateway 2. The flr_rls message 578 is translated into a common format 580 by the signaling bridge 314 and forwarded to the controller 312. The flr_idle_com message is then forwarded to the controller 302, translated by the signaling bridge 304 into the calling carrier's format 582 and forwarded to the calling carrier 1 through the border gateway 1.

As illustrated, the calling carrier 1 then transmits another flr_idle message to the target carrier 2. When the caller terminates the call, e.g., by hanging up, the calling carrier 1 transmits a call_rls message 590 to the border gateway 1. The message is translated by the signaling bridge 304, transferred between the controllers 302 and 316, translated into the target carrier's technology 594 and forwarded to the target carrier 3. Upon receiving the call_rls message, the elements of the inter-working architecture release allocated resources and terminate the PTT session.

It will be appreciated that other session configurations and call flow routing may be implemented within the spirit and scope of the present invention. For example, it is contemplated that a PTT session may be implemented in which the PTT signaling is handled via a two signaling controllers but the media bearer paths are setup through a single media gateway.

Figure 10:
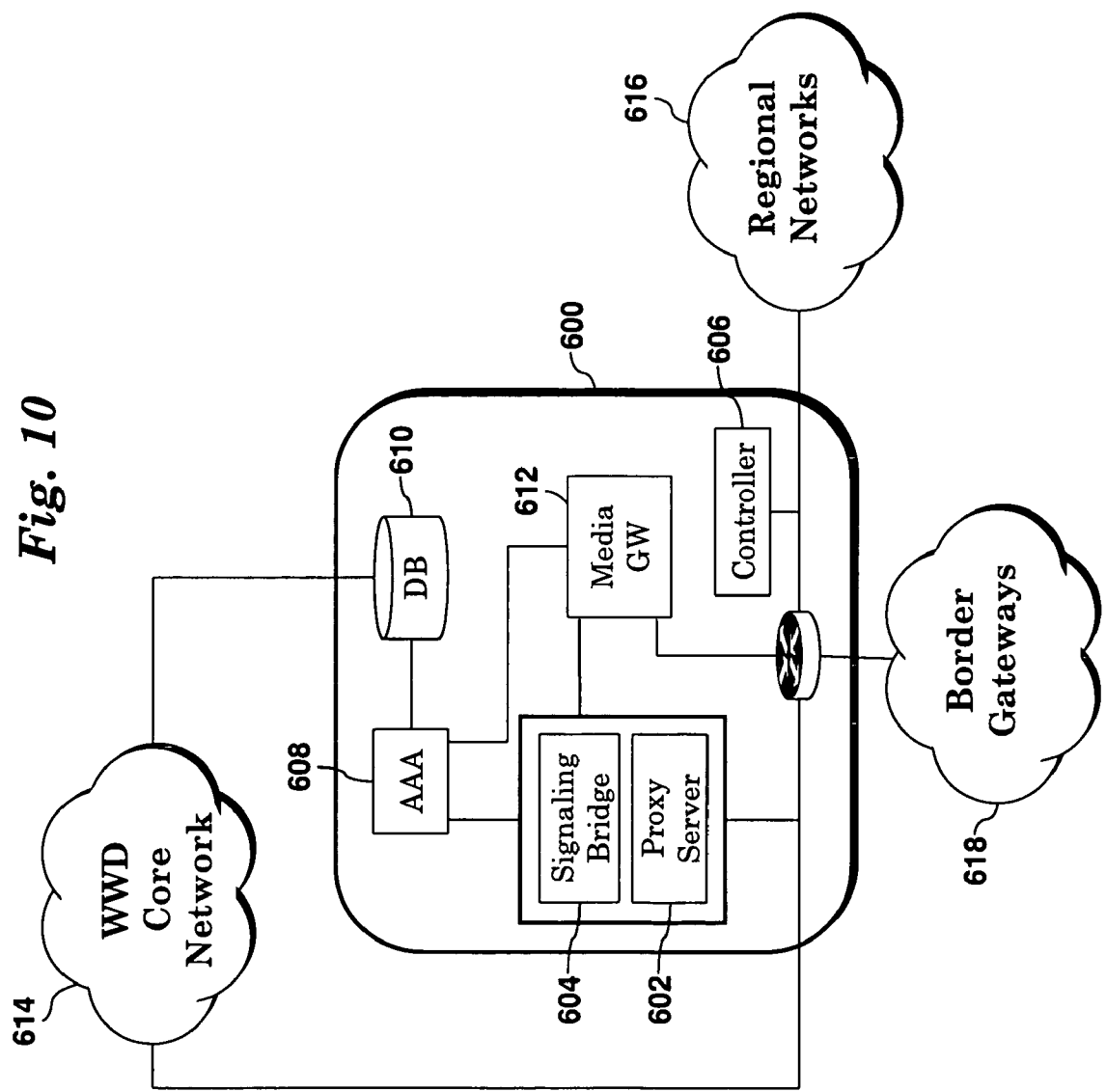
FIG. 10 illustrates a third embodiment of a PTT inter-working architecture.

A third embodiment of an inter-working architecture is illustrated in FIG. 10. This embodiment is similar to the second embodiment illustrated in FIG. 6, but includes a proxy 602 to control whether WWD sessions between carriers will be translated. As illustrated, at least one POP 600 is networked with the WWD core network 614, regional networks 616 and at least one border gateway 618. The POP 600 includes the proxy server 602, a signaling bridge 604, a controller 606, an AAA 608, a regional database 610 and a media gateway 612. By routing session through the proxy 602, sessions between carriers with the same PTT technologies will be implemented without translation into a common protocol. This reduces the call setup and floor arbitration latencies associated with the inter-working calls of the second embodiment.

Figure 11:
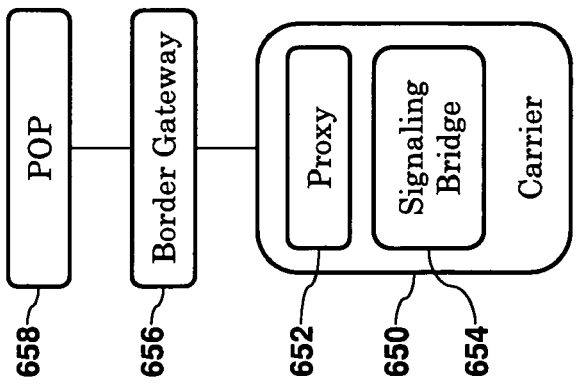
FIG. 11 illustrates a fourth embodiment of a PTT inter-working architecture.

Referring to FIG. 11, in a fourth embodiment at least one carrier network 650 includes a proxy server 652 and a signaling bridge 654. The carrier network 650 is connected to the WWD network through a border gateway 656 and a POP 658. The proxy and signaling bridge functions are included in the POP 658 (or other POPs) to serve carriers who have not deployed the signaling bridge functionality as part of their PTT infrastructure deployment. In this embodiment, the signaling traffic received from the carrier 650 by the WWD network is already in the common WWD format, as the translation is done by the carrier premises before its gets forwarded to the WWD network for further processing. The POP 658 may still determine whether conversion is required, as the session may have originated from a carrier that does not perform its own conversion. The core WWD infrastructure includes the components previously described in other embodiments.

Figure 12:
FIG. 12 is a call flow illustrating an operation of the PTT inter-working architecture of the third embodiment.

An embodiment of the operation of the architecture of FIG. 10 will now be described with reference to FIG. 12. An incoming PTT request 620 is routed to regional inter-working components of the WWD architecture that service the originating PTT network. The regional inter-working components determine the appropriate WWD architecture components to handle the PTT session request, such as POP 600, in step 622. In step 624, if the PTT session requires translation then the proxy 602 routes the session to the signaling bridge 604 where it is converted to a common WWD protocol in step 626. In step 628, transcoders are selected for the PTT session, and then address and name translation is then performed via the controller 606 and the WWD core network 614 in step 630. If the session does not require translation then the proxy 602 bypasses steps 626 and 628. In step 632, the controller 606 determines the location of the target user(s), and in step 634 media server(s) are selected for the PTT session. The region of the target user(s) is determined in step 636. In step 638, if the PTT request requires translation then the request is converted from the common format to the target format in step 640. The PTT request is next forwarded to regional inter-working components servicing the target user(s), which may be located on a different POP, and then to the target carrier.

Figure 13:
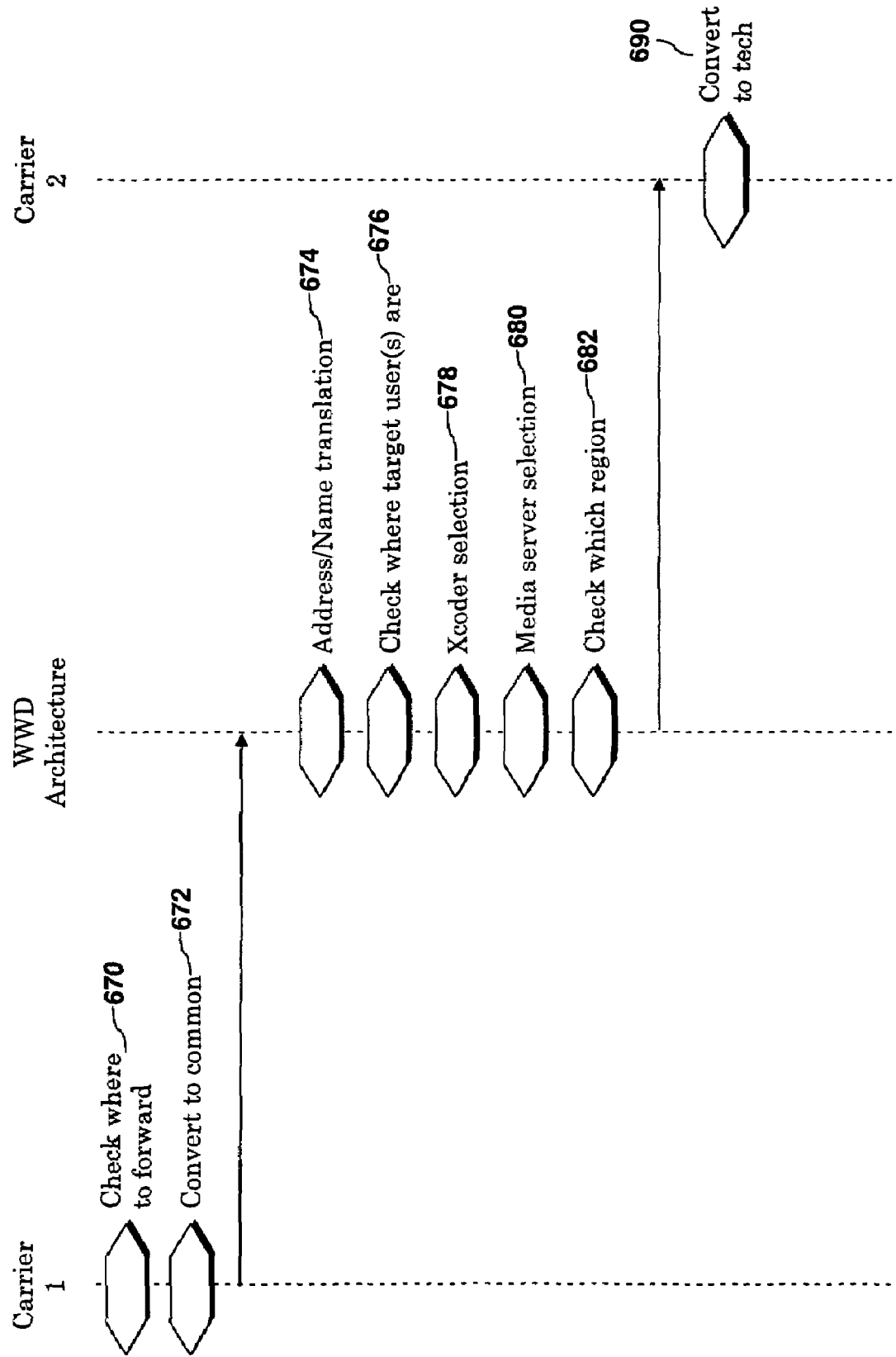
FIG. 13 is a call flow illustrating an operation of the PTT inter-working architecture of the fourth embodiment.

An embodiment of the operation of the architecture of FIG. 11 is illustrated in FIG. 13. In step 670, a local PTT carrier routes sessions either internally or to a proxy server depending on the technologies of the originating and terminating entities. If the terminating entity has the same technology then the session is forwarded without translation. If the terminating entity and originating entity operate using different technologies, then the signaling bridge 654 translates the session into the common WWD protocol in step 672 and forwards the session to the WWD network. The WWD network performs any necessary address and name translation in step 674, determines the target location in step 676, selects xcoder for the session in step 678, selects media servers for the session in step 680, and identifies the WWD target region in step 682. The WWD architecture determines whether the terminating carrier (1) uses the same technology, and thus requires no translation, (2) requires translation, or (3) handles translation in the carrier network. If the terminating carrier includes a proxy and signaling bridge then the message may be forwarded to the carrier in the common WWD format. In step 690, the terminating carrier performs any necessary conversion from the WWD format to the terminating carrier's technology.

Having thus described various embodiments of the present invention, it should be apparent to those skilled in the art that certain advantages of the within described system have been achieved. It should also be appreciated that various modifications, adaptations, and alternative embodiments thereof may be made within the scope and spirit of the present invention.

What is claimed is:

1. A network for inter-working a plurality of dispatch networks, at least two of the dispatch networks having incompatible technologies, the network comprising:
   a core inter-working network;
   a plurality of points-of-presence connected to the core inter-working network, wherein at least one point-of-presence includes a signaling bridge adapted to translate dispatch session messages received from an originating dispatch network into a common signaling format before session processing; and
   a plurality of border gateways interfacing each of the dispatch networks to at least one of the plurality of points-of-presence.

2. The network of claim 1 wherein the core inter-working network includes a centralized database storing call detail records and usage data reports relating to dispatch sessions implemented across the network.

3. The network of claim 1 wherein the core inter-working network includes a billing clearinghouse.

4. The network of claim 1 wherein at least one point-of-presence is adapted to translate signals from the common signaling format into a format compatible with a target dispatch network.

5. The network of claim 4 wherein the at least one point-of-presence further includes a proxy server, and wherein the proxy server receives an incoming dispatch request from the originating dispatch network and determines whether translation is required between signaling formats of the originating and target dispatch networks.

6. The network of claim 5 wherein translation by the signaling bridge is performed when the proxy server determines that translation is required, and wherein dispatch session messages are not translated by the signaling bridge when the proxy server determines that translation is not required.

7. The network of claim 5 wherein the translation determination is based on stored information relating to the dispatch networks.

8. The network of claim 5 wherein the translation determination is based on protocol information embedded in the incoming dispatch request.

9. The network of claim 1 wherein at least one point-of-presence includes a proxy, a signaling controller, and a media gateway.

10. The network of claim 1 wherein each point-of-presence interfaces with the core inter-working network to locate a target dispatch network associated with a target user, and wherein each point-of-presence is adapted to determine a regional point-of-presence serving the target dispatch network.

11. The network of claim 10 wherein at least one point-of-presence is adapted to serve both an originating dispatch network and the target dispatch network on a dispatch session.

12. The network of claim 10 wherein the originating point-of-presence is adapted to transmit dispatch signaling messages directly to the target dispatch network.

13. A network for inter-working a plurality of dispatch networks, at least two of the dispatch networks operating on incompatible technologies, comprising:
   a network of regional inter-working components, including:
      an inter-working point-of-presence; and
      a border gateway including an interface to at least one dispatch network, the border gateway adapted to route traffic from the dispatch network to the inter-working point-of-presence;

a core inter-working system, interfaced with the regional inter-working components, providing centralized dispatch functions for the inter-working network; and a service delivery interface including a signaling controller, a signaling bridge and a media gateway, the service delivery interface providing a real-time data path between the point-of-presence and an inter-working dispatch application server.

14. The network of claim 13 wherein the core inter-working system includes a network management system.

15. The network of claim 13 wherein the core inter-working system includes:
a location server providing location services to the point-of-presence;
a group server providing group management services to the point-of-presence;
a policy server providing policy management services to the point-of-presence; and
an address translation server providing address translation services to the point-of-presence.

16. The network of claim 13 wherein the point-of-presence comprises a network including:
a custom dispatch gateway;
an authentication, authorization and accounting entity; and
a regional database.

17. The network of claim 16 wherein the custom dispatch gateway is adapted to receive a dispatch session request from a dispatch network, the dispatch session request including at least one target user.

18. The network of claim 17 further comprising a plurality of inter-working points-of-presence, and wherein the custom dispatch gateway is interfaced with the core inter-networking system for identifying a target dispatch network and target point-of-presence associated with each target user.

19. The network of claim 18 wherein the custom dispatch gateway is adapted to select media resources for the requested dispatch session.

20. The network of claim 13 wherein the core inter-working system includes a billing clearinghouse.

21. The network of claim 20 wherein each custom dispatch gateway is adapted to create and forward call detail records to the billing clearinghouse.

22. The network of claim 13 wherein a first dispatch network is an iDEN network and a second dispatch network is a high performance push-to-talk network, and wherein the inter-working network is adapted to facilitate dispatch communications between subscribers in the first and second dispatch networks.

23. The network of claim 13 wherein a first dispatch network is an iDEN network an a second dispatch network is a PoC network, and wherein the inter-working network is adapted to facilitate dispatch communications between subscribers in the first and second dispatch networks.

24. The network of claim 13 wherein a first dispatch network is a high performance push-to-talk network and a second dispatch network is a PoC network, and wherein the inter-working network is adapted to facilitate dispatch communications between subscribers in the first and second dispatch networks.

25. A method for inter-working a plurality of disparate dispatch networks, each dispatch network providing dispatch services to a plurality of subscriber units, comprising the steps of:

receiving a dispatch session request from an originating dispatch network, the dispatch session request including a target address identifying a user;

identifying the target dispatch network;

determining whether media and signaling translation is required;

translating the received dispatch session request to a common inter-working format, if translation is required;

processing the translated dispatch session request;

translating the processed dispatch session request to a format associated with the target address, if translation is required; and forwarding the translated dispatch session request to the target dispatch network.

26. The method of claim 25 wherein the dispatch session request identifies a target address of a user that is not a subscriber of the originating dispatch network.

27. The method of claim 25 wherein the dispatch session request is received by a border gateway.

28. The method of claim 25 wherein the step of processing is performed by a first regional network.

29. The method of claim 28 wherein the step of forwarding includes transmitting the translated dispatch session request to a regional network associated with the target dispatch network.

30. The method of claim 29 further comprising the steps of setting up the media path and allocating media resources in the first and second regional networks for the dispatch session.

31. The method of claim 30 wherein media packets are transmitted between the originating dispatch network and the target dispatch network via the allocated media resources in the first regional network and the allocated media resources in the second regional network.

32. The method of claim 25 further comprising the steps of setting up the media patch and allocating media resources in a single regional network, wherein media packets are transmitted between the originating dispatch network and the target dispatch network along the media path and the allocated media resources.

33. The method of claim 32 wherein signaling translation is performed in both a first regional network associated with the originating network and a second regional network associated with the target network.

34. The method of claim 25 further comprising determining whether translation is required for the dispatch session request, wherein the steps of translating the received dispatch request and translating the processed dispatch session are performed only if translation is needed.

35. A method for inter-working a plurality of disparate dispatch networks, each dispatch network providing dispatch services to a plurality of subscriber units, comprising the steps of:

receiving a dispatch session request from an originating dispatch network, the dispatch session request identifying a target user;

translating the dispatch session request received from the originating dispatch network into a common signaling format;

processing, in a point-of-presence, the dispatch session request, including allocating signaling and media resources; and forwarding the dispatch session request to a border gateway associated with the target dispatch network.

36. The method of claim 35 wherein signaling resources are allocated in a plurality of points-of-presence and media resources are allocated in one point-of-presence.

37. The method of claim 35 wherein signaling resources are allocated in a first point-of-presence and media resources are allocated in a second point-of-presence.

* * * * *